United States Patent
Baek et al.

(10) Patent No.: US 11,601,915 B2
(45) Date of Patent: Mar. 7, 2023

(54) V2X COMMUNICATION APPARATUS AND MULTI-CHANNEL TRANSMISSION METHOD THEREOF

(71) Applicant: LG ELECTRONICS INC., Seoul (KR)

(72) Inventors: Jongseob Baek, Seoul (KR); Woosuk Ko, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/973,952

(22) PCT Filed: Jun. 11, 2018

(86) PCT No.: PCT/KR2018/006613
§ 371 (c)(1),
(2) Date: Dec. 10, 2020

(87) PCT Pub. No.: WO2019/240304
PCT Pub. Date: Dec. 19, 2019

(65) Prior Publication Data
US 2021/0250908 A1    Aug. 12, 2021

(51) Int. Cl.
*H04W 72/02* (2009.01)
*H04W 72/04* (2009.01)
*H04W 72/10* (2009.01)
*H04W 4/44* (2018.01)
*H04W 4/40* (2018.01)

(52) U.S. Cl.
CPC ............. *H04W 72/02* (2013.01); *H04W 4/40* (2018.02); *H04W 4/44* (2018.02); *H04W 72/0486* (2013.01); *H04W 72/10* (2013.01)

(58) Field of Classification Search
CPC . H04W 72/02; H04W 72/10; H04W 72/0486; H04W 4/40; H04W 4/44
See application file for complete search history.

(56) References Cited

U.S. PATENT DOCUMENTS

| | | | |
|---|---|---|---|
| 2018/0048572 A1* | 2/2018 | Gulati | H04W 52/346 |
| 2019/0150197 A1* | 5/2019 | Sheu | H04W 72/1242 370/329 |

(Continued)

FOREIGN PATENT DOCUMENTS

| | | |
|---|---|---|
| KR | 101506598 | 3/2015 |
| WO | 2014073748 | 5/2014 |
| WO | 2017176098 | 10/2017 |

OTHER PUBLICATIONS

Huawei et al., Introduction of eV2X in TS 36.300, R2-1808922, 3GPP TSG RAN WG2 Meeting #102, Busan, Korea, Jun. 3, 2018, see p. 13.

(Continued)

*Primary Examiner* — Asghar H Bilgrami
(74) *Attorney, Agent, or Firm* — Dentons US LLP

(57) ABSTRACT

A multi-channel transmission method of a V2X communication apparatus is disclosed. A multi-channel transmission method of a V2X communication apparatus according to an embodiment of the present disclosure includes acquiring CBR values for each of a plurality of channels; setting a CBR threshold on the basis of the CBR values; selecting a channel candidate group on the basis of the CBR threshold; and transmitting data through a channel included in the channel candidate group.

11 Claims, 8 Drawing Sheets

(56) References Cited

U.S. PATENT DOCUMENTS

| | | | | |
|---|---|---|---|---|
| 2019/0215801 A1* | 7/2019 | Mok | ...................... | H04W 76/27 |
| 2019/0313279 A1* | 10/2019 | Li | .......................... | H04W 72/12 |
| 2020/0229194 A1* | 7/2020 | Belleschi | .............. | H04L 5/0064 |
| 2020/0280827 A1* | 9/2020 | Fechtel | ................... | H04W 4/40 |
| 2020/0351705 A1* | 11/2020 | Chae | ................... | H04W 72/042 |

OTHER PUBLICATIONS

Oppo, UL/SL prioritization in eV2x, R2-1806685, 3GPP TSG RAN WG2 Meeting #102, Busan, Korea, May 11, 2018, see pp. 1-3.

\* cited by examiner

[FIG. 1]
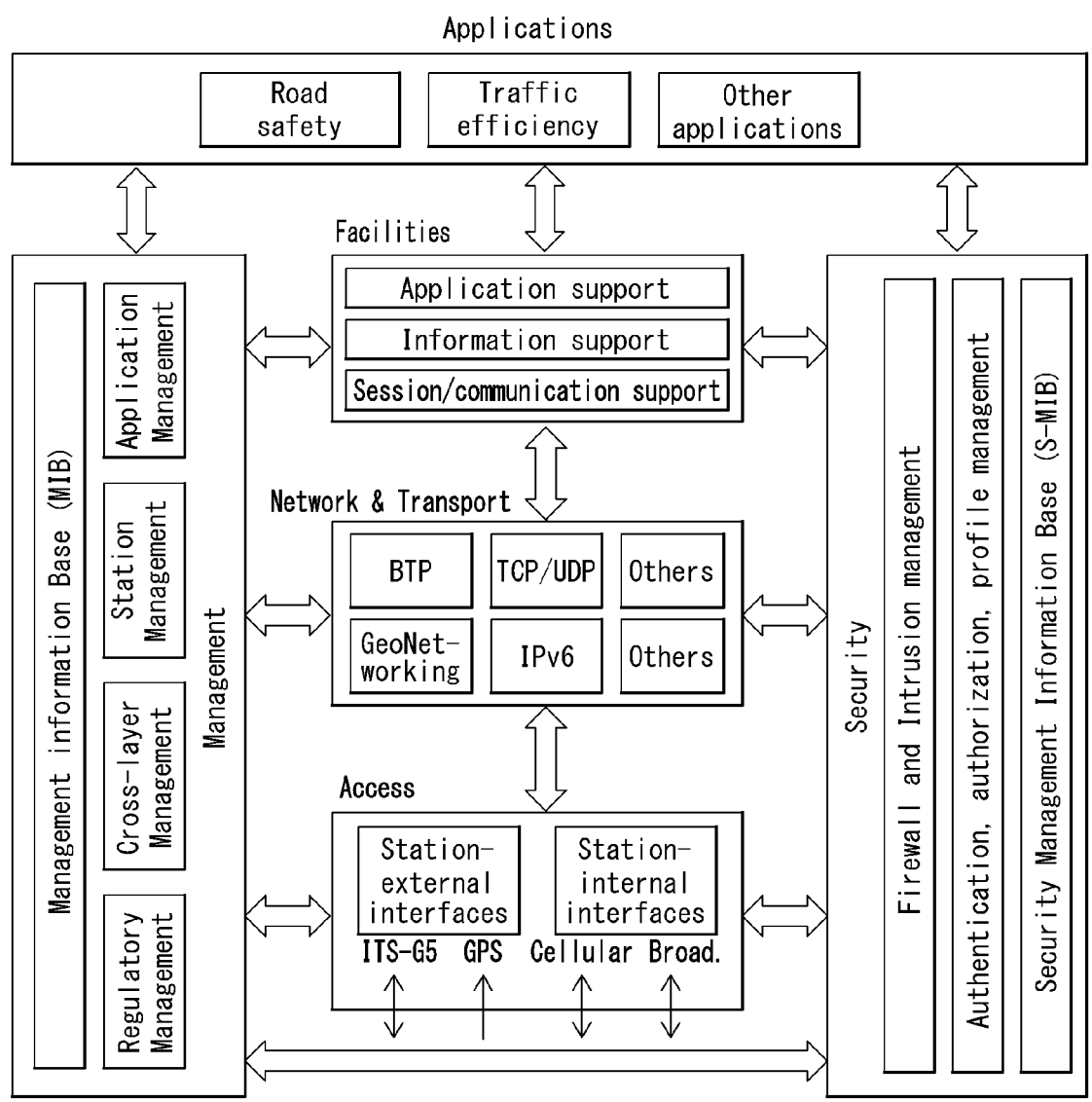

【FIG. 2】
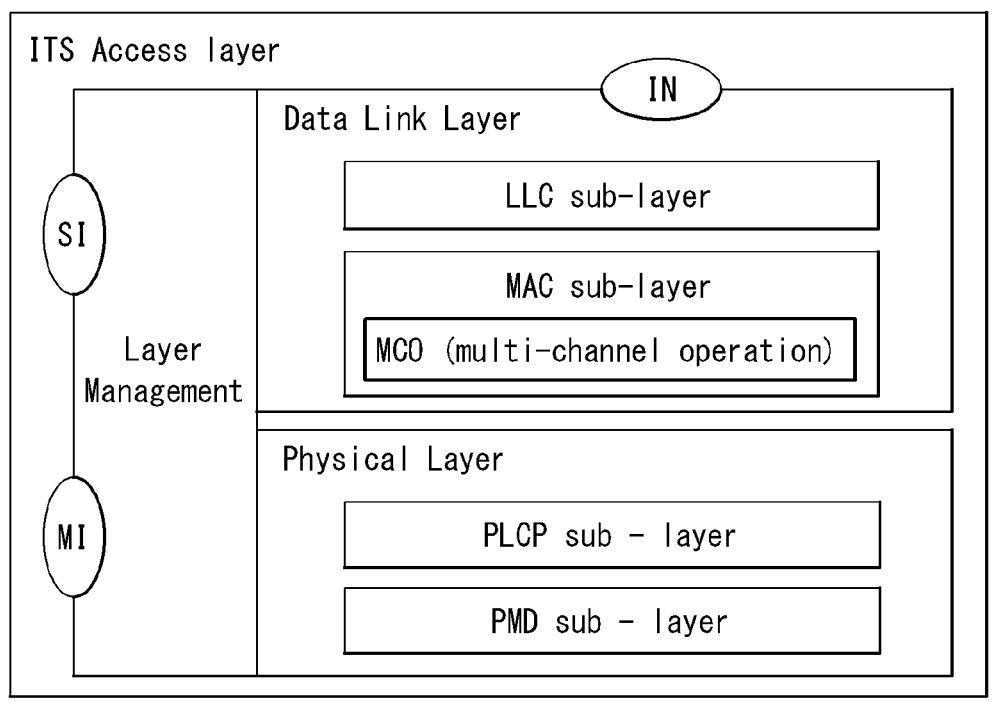

[FIG. 3]
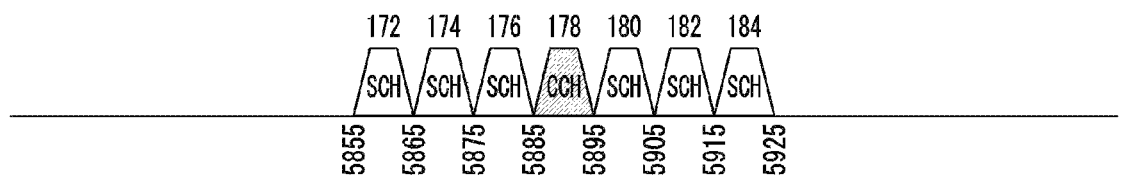
(a)
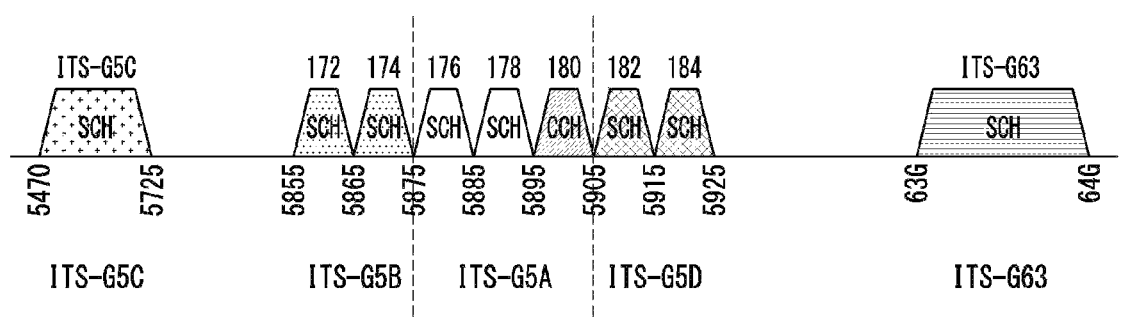
(b)

[FIG. 4]
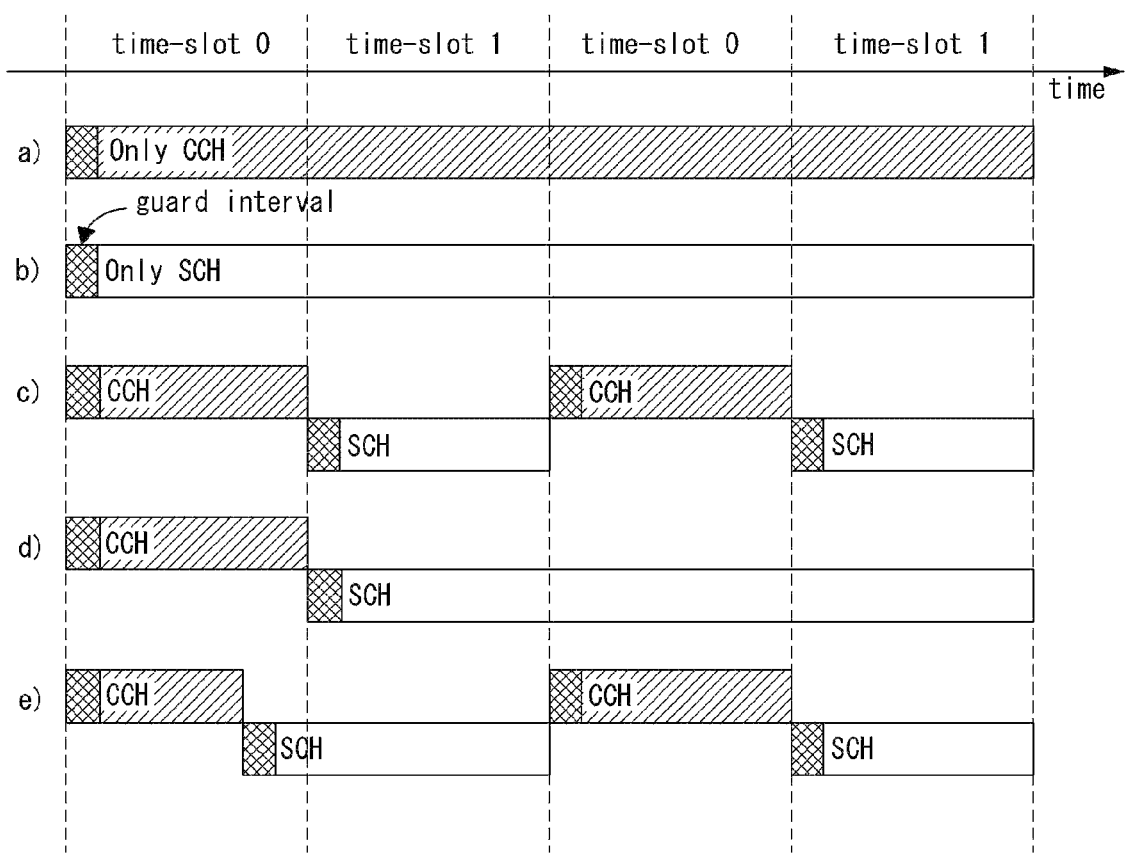

[FIG. 5]
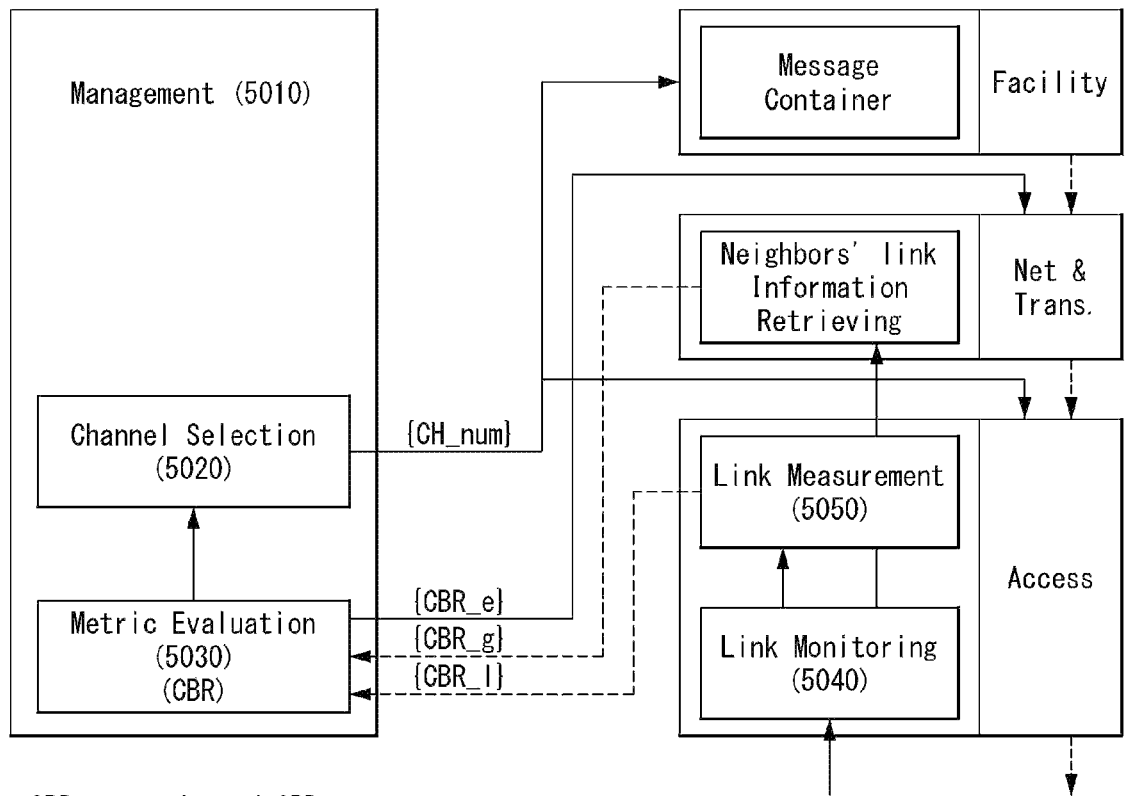
CBR_e: estimated CBR
CBR_g: global CBR
CBR_l: local CBR
[FIG. 6]
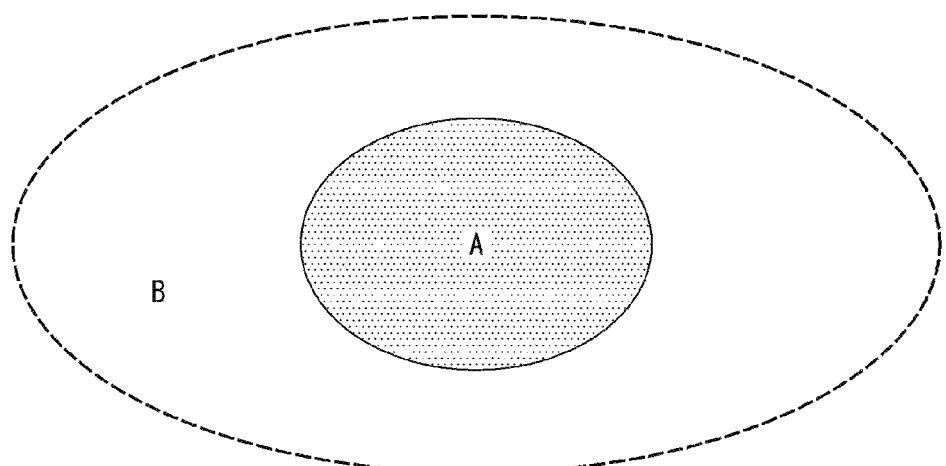

【FIG. 7】
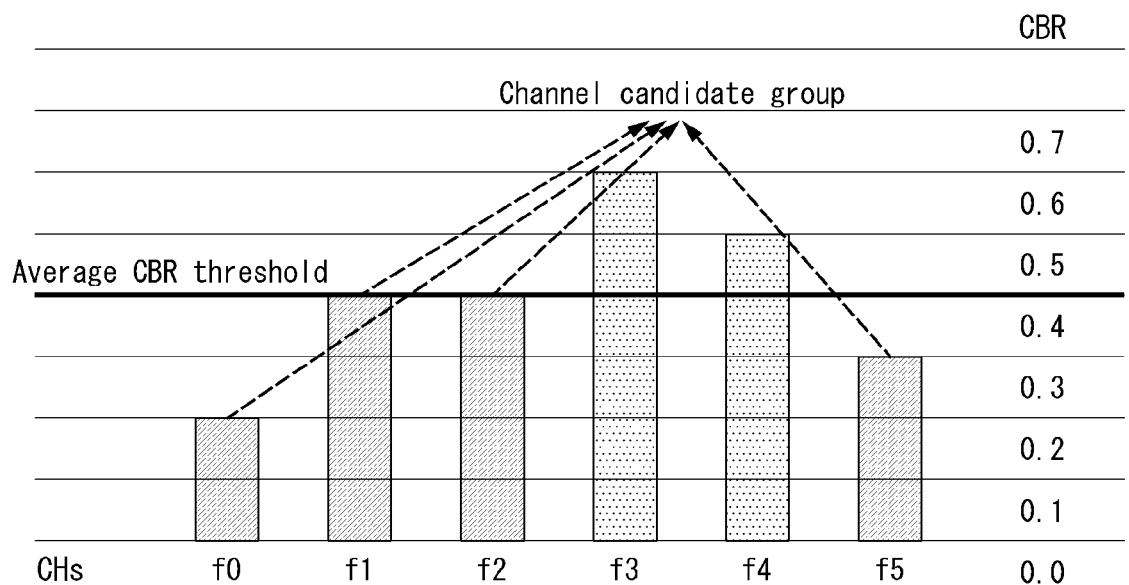
【FIG. 8】
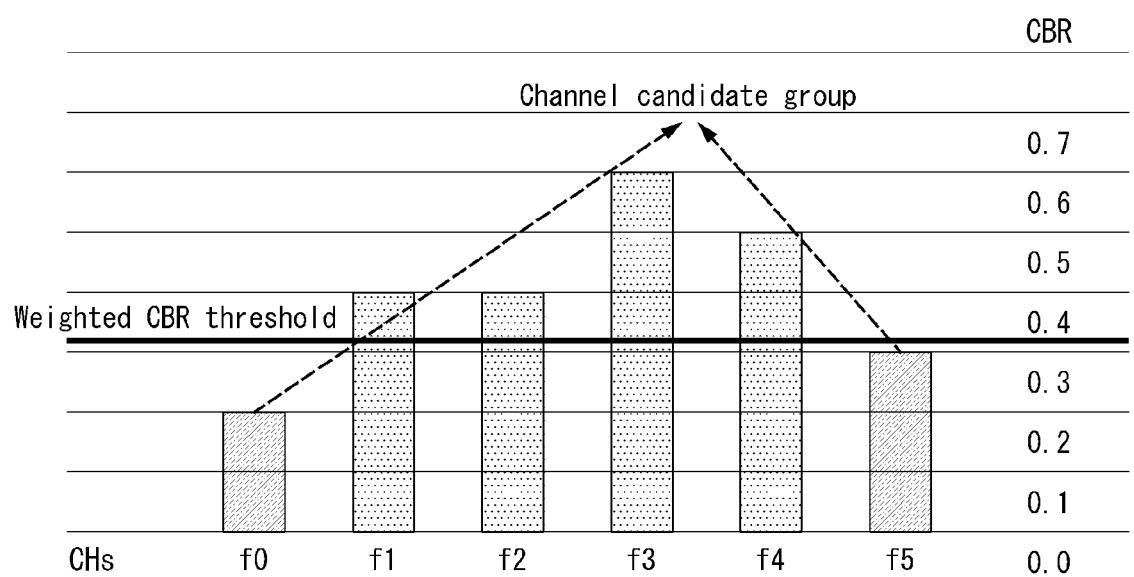

【FIG. 9】
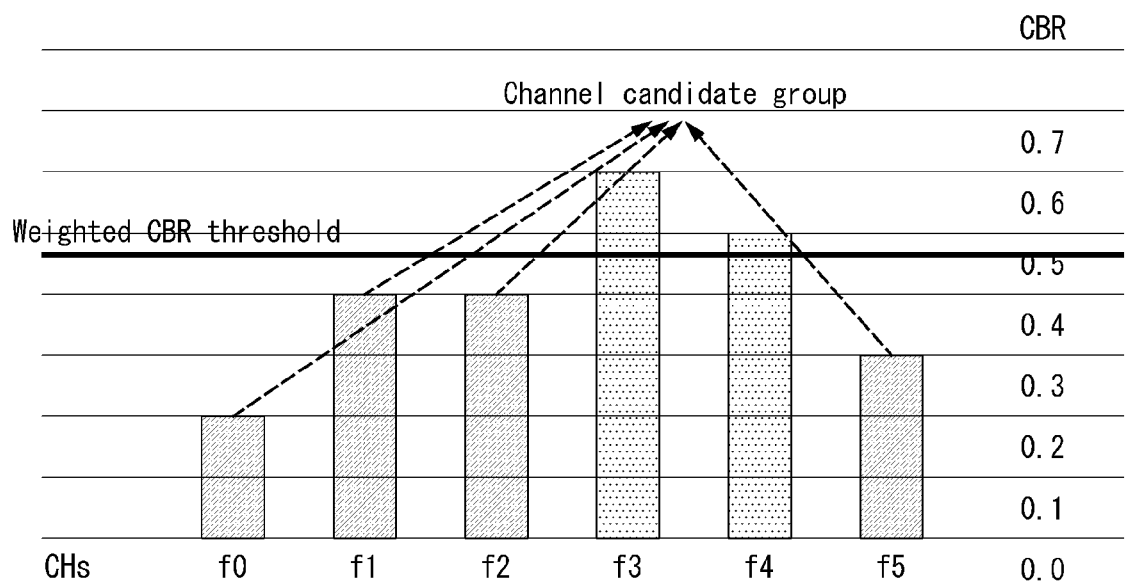
【FIG. 10】
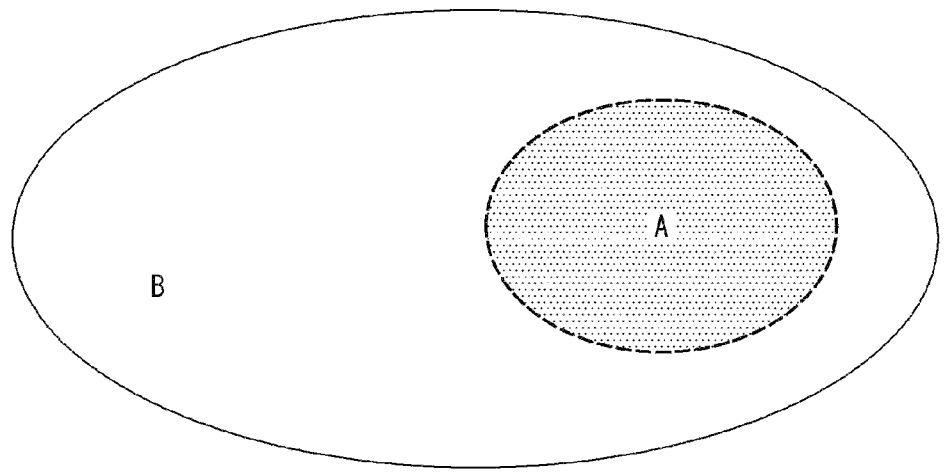

[FIG. 11]
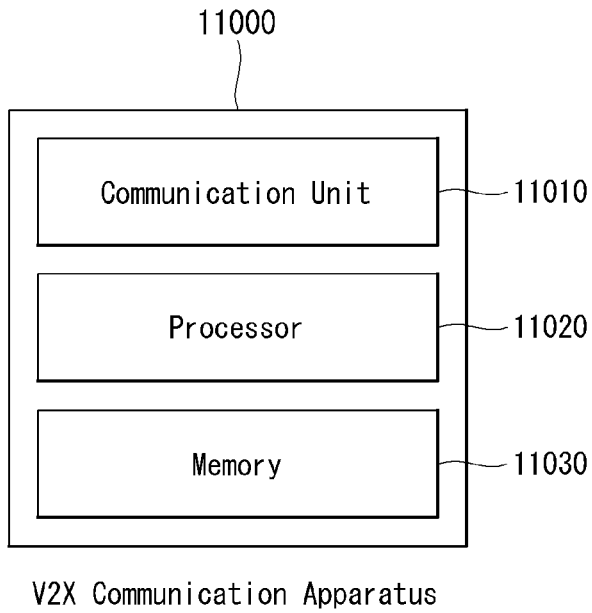
V2X Communication Apparatus
[FIG. 12]
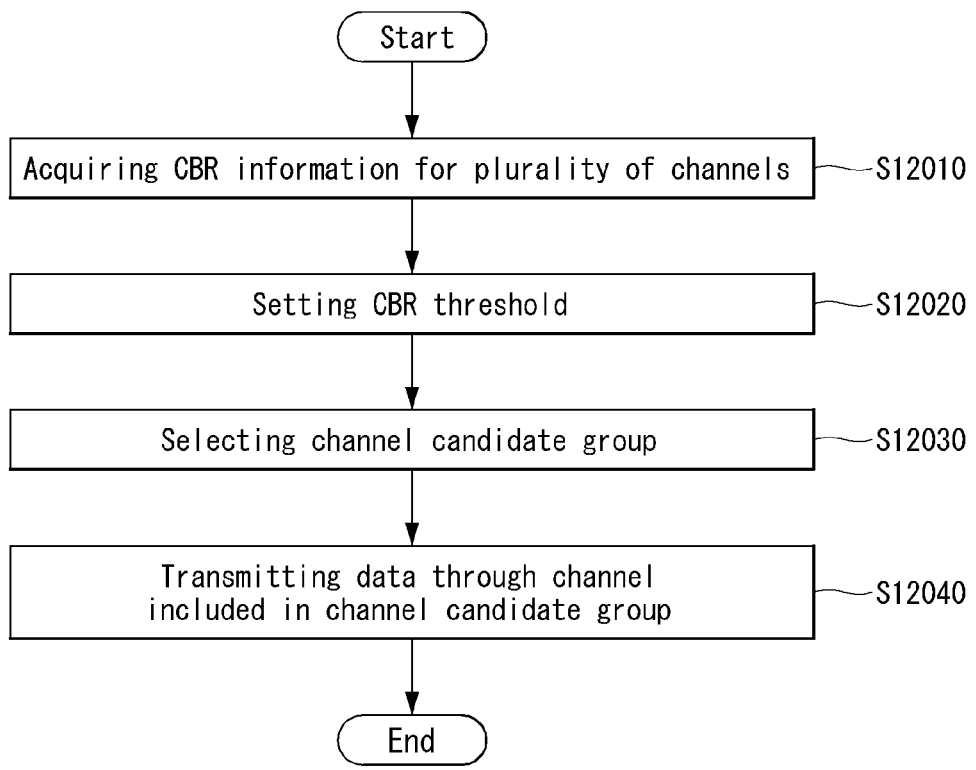

V2X COMMUNICATION APPARATUS AND MULTI-CHANNEL TRANSMISSION METHOD THEREOF

This application is the National Stage filing under 35 U.S.C. 371 of International Application No. PCT/KR2018/006613, filed on Jun. 11, 2018, the contents of which is hereby incorporated by reference herein in its entirety.

TECHNICAL FIELD

The present disclosure relates to an apparatus for V2X communication and a multi-channel transmission method, in particular, after selecting a channel to transmit data in a multi-channel environment, to a multi-channel transmission method for transmitting the data using the selected channel.

BACKGROUND ART

Vehicles are now being transformed from a product largely dependent on mechanical engineering to a product based on fusion of industrial technologies such as electrical, electronic, and communication technologies. In this regard, a vehicle is also called a smart car. A smart car connects the driver, the vehicle, and the transport infrastructure to provide not only conventional vehicle technology-based services such as traffic safety or congestion reduction but also various user-customized mobile services. This kind of connectivity may be implemented by using Vehicle-to-Everything (V2X) communication technology. The connectivity may be implemented using various V2X communication technologies such as European ITS-G5, US WAVE, and NR (New Radio). NR may include new inter-vehicle communication technologies developed in the future, including cellular V2X such as LTE-V2X and 5G-V2X.

DETAILED DESCRIPTION OF INVENTION

Technical Problem

Various services may be provided through V2X communication. In addition, a plurality of frequency bands are used to provide the various services. Even in such an environment, reliable delivery and provision of safety services is a very important issue due to the characteristics of vehicle communication.

In particular, in a multi-channel environment, V2X communication apparatuses must select a channel to transmit data, but it is a very important issue to select the channel so that a channel load is low due to characteristics of the V2X communication, where latency is critical.

Technical Solution

In order to solve the above technical problem, a multi-channel transmission method of a V2X communication apparatus according to an embodiment of the present disclosure includes acquiring CBR values for each of a plurality of channels; setting a CBR threshold based on the CBR values; selecting a channel candidate group based on the CBR threshold; and transmitting data through a channel included in the channel candidate group.

In the multi-channel transmission method of the V2X communication apparatus according to an embodiment of the present disclosure, the CBR threshold may correspond to an average value of the CBR values for each of the plurality of channels, and the average value may be calculated instantaneously or adaptively.

In the multi-channel transmission method of the V2X communication apparatus according to an embodiment of the present disclosure, the channel candidate group may include channels whose CBR value is less than or equal to the CBR threshold.

In the multi-channel transmission method of the V2X communication apparatus according to an embodiment of the present disclosure, the CBR threshold may apply a weight to the CBR average value, and the weight may be related with a priority of service corresponding to the transmitted data.

In the multi-channel transmission method of the V2X communication apparatus according to an embodiment of the present disclosure, the priority of the service may include a low priority, a medium priority, and a high priority, and if the service has the medium priority, the weight may be 1, if the service has the high priority, the weight may be set to a value that decreases the CBR average value, and if the service has the low priority, the weight may be set to a value that increases the CBR average value.

In the multi-channel transmission method of the V2X communication apparatus according to an embodiment of the present disclosure, the priority of the service may include a low priority, a medium priority, and a high priority, and if the service has the medium priority, the weight may be 1, if the service has the high priority, the weight may be set to a value that increases the CBR average value, and if the service has the low priority, the weight may be set to a value that decreases the CBR average value.

In the multi-channel transmission method of the V2X communication apparatus according to an embodiment of the present disclosure, based on multi-hop transmission of the data, a number of hopping channels may be determined based on the priority of the service corresponding to the transmitted data.

In order to solve the above technical problem, a V2X communication apparatus according to an embodiment of the present disclosure includes a memory configured to store data; an RF unit configured to transmit and receive radio signals; and a processor configured to control the memory and the RF unit, wherein the processor is configured to acquire CBR values for each of a plurality of channels, set a CBR threshold based on the CBR values, select a channel candidate group based on the CBR threshold, and transmit data through a channel included in the channel candidate group.

Advantageous Effects

According to the present disclosure, since a data transmission channel is determined based on a CBR value, it is possible to distribute a channel load, especially when transmitting data for a service for which a channel is not predetermined. The CBR value is calculated instantaneously, so that the channel load distribution at the time of transmission can be optimized. The CBR value is calculated adaptively, so that so that it can be considered to use a channel at a time other than the data transmission time. A weight is applied to the calculation of the CBR threshold, so that a transmission channel candidate according to the system needs can be determined.

In channel determination, a service priority can be considered. According to the present disclosure, since the priority is related with the CBR threshold, a service having a high priority can be transmitted more effectively. Data of the service having the high priority can be transmitted through channels having a low CBR value. In addition, the data of the service having the high priority can be selected and transmitted from among more channels.

In addition, according to the present disclosure, channel selection can be effectively performed in multi-hop transmission.

Overall, according to the present disclosure, it is possible to efficiently use a channel/resource when transmitting data, and to reduce latency when transmitting data.

DESCRIPTION OF DRAWINGS

The accompanying drawings, which are included herein as a part of the description to help understanding the present disclosure, provide embodiments of the present disclosure and describe the technical features of the present disclosure with the description below.

FIG. 1 illustrates reference architecture of an Intelligent Transport System (ITS) station according to an embodiment of the present disclosure.

FIG. 2 illustrates an ITS access layer according to an embodiment of the present disclosure.

FIG. 3 illustrates multi-channel allocation used for an ITS system operation according to an embodiment of the present disclosure.

FIG. 4 illustrates a channel coordination mode of multi-channel operation according to an embodiment of the present disclosure.

FIG. 5 shows an operation structure between layers for channel selection according to an embodiment of the present disclosure.

FIG. 6 shows a relationship between channel candidate groups in consideration of a service priority according to an embodiment of the present disclosure.

FIG. 7 shows a method of selecting a channel candidate group for a medium-priority service according to an embodiment of the present disclosure.

FIG. 8 shows a method of selecting a channel candidate group for a high-priority service according to an embodiment of the present disclosure.

FIG. 9 shows a method of selecting a channel candidate group for a low-priority service according to an embodiment of the present disclosure.

FIG. 10 shows a relationship between channel candidate groups considering a service priority according to another embodiment of the present disclosure.

FIG. 11 shows a V2X communication apparatus according to an embodiment of the present disclosure.

FIG. 12 is a flowchart illustrating a multi-channel transmission method of a V2X communication apparatus according to an embodiment of the present disclosure.

MODE FOR INVENTION

Preferred embodiments of the disclosure will be described in detail with reference to the accompanying drawings. The following detailed description with reference to the attached drawings illustrates preferred embodiments of the disclosure rather than illustrating only embodiments that may be implemented according to embodiments of the disclosure. The following detailed description includes details in order to provide a thorough understanding of the disclosure, but the disclosure does not require all of these details. In the disclosure, embodiments described hereinafter are not intended to be respectively used independently. Multiple embodiments or all embodiments may be used together, and specific embodiments may be used in combination.

Most of terms used in the disclosure are selected from general ones widely used in the art, but some terms are optionally selected by an applicant and meanings thereof are described in detail in the following description as needed. Accordingly, the disclosure should be understood based on the intended meaning of the term rather than a simple name or meaning of the term.

The disclosure relates to a V2X communication device, and the V2X communication device may be included in an Intelligent Transport System (ITS) to perform all or some of functions of the ITS system. The V2X communication device may perform communication with a vehicle and a vehicle, a vehicle and an infrastructure, a vehicle and a bicycle, and mobile devices. The V2X communication device may be abbreviated to a V2X device. In an embodiment, the V2X device may correspond to an On Board Unit (OBU) of a vehicle or may be included in an OBU. The V2X device may correspond to a Road Side Unit (RSU) of an infrastructure or may be included in an RSU. Alternatively, the V2X communication device may correspond to an ITS station or may be included in an ITS station. In an embodiment, the V2X device may operate in a Wireless Access In Vehicular Environments (WAVE) system of IEEE 1609.1 to 4.

FIG. 1 illustrates reference architecture of an Intelligent Transport System (ITS) station according to an embodiment of the disclosure.

In the architecture of FIG. 1, two end vehicles/users may communicate with a communication network, and such communication may be performed through a function of each layer of the architecture of FIG. 1. For example, when a message between vehicles is communicated, in a transmitting vehicle and an ITS system thereof, by passing through each layer below one layer, data may be transferred, and in a receiving vehicle and an ITS system thereof, by passing through each layer above one layer, data may be transferred. A description of each layer of the architecture of FIG. 1 is as follows.

Application layer: the application layer may implement and support various use cases. For example, the application may provide road safety, efficient traffic information, and other application information.

Facilities layers: the facilities layer may support to effectively realize various use cases defined at the application layer. For example, the facilities layer may perform application support, information support, and session/communication support.

Networking & Transport layer: the networking/transport layer may constitute a network for vehicle communication between homogenous/heterogenous networks by using various transport protocols and network protocols. For example, the networking/transport layer may provide Internet access and routing using an Internet protocol such as TCP/UDP+IPv6. Alternatively, the networking/transport layer may constitute a vehicle network using a geographical position based protocol such as Basic Transport Protocol (BTP)/GeoNetworking.

Access layer: the access layer may transmit a message/data received from a superordinate layer through a physical channel. For example, the access layer may perform/support data communication based on IEEE 802.11 and/or 802.11p standard based communication technology, ITS-G5 wireless communication technology based on IEEE 802.11 and/or 802.11p standard physical transmission technology, 2G/3G/4G(LTE)/5G wireless cellular communication technology including satellite/broadband wireless mobile communication, broadband terrestrial digital broadcasting technology such as DVB-T/T2/ATSC, GPS technology, and IEEE 1609 WAVE technology.

ITS architecture may further include a management layer and a security layer.

FIG. 2 illustrates an ITS access layer according to an embodiment of the disclosure.

FIG. 2 illustrates in more detail the ITS Access Layer of the ITS system of FIG. 1. The access layer of FIG. 2 may include a data link layer, a physical layer, and layer management. The access layer of FIG. 2 has characteristics similar to or identical to an OSI 1 layer (physical layer) and an OSI 2 layer (data link layer).

The data link layer may include a Logical Link Control (LLC) sub-layer, a Medium Access Control (MAC) sub-layer, and a Multi-channel operation (MCO) sub-layer. The physical layer may include a Physical Layer Convergence Protocol (PLCP) sub-layer and a Physical Medium Access (PMD) sub-layer.

In order to enable a superordinate network layer to use a physical line between adjacent nodes (or between vehicles) having noise, the data link layer may convert the physical line into a communication channel having no transmission error. The data link layer performs a function of transmitting/transporting/transferring a 3-layer protocol, a framing function of dividing and grouping data to transmit into a packet (or frame) as a transmission unit, a flow control function of compensating a speed difference between the sending side and the receiving side, and a function of detecting and modifying or retransmitting a transmission error. Further, the data link layer performs a function of giving a sequence number to a packet and an ACK signal in order to avoid to erroneously confuse the packet or the ACK signal and a function of controlling setting, maintaining, short-circuit, and data transmission of a data link between network entities. Furthermore, such a data link layer may include a logical link control (LLC) sub-layer and a medium access control (MAC) sub-layer based on IEEE 802 standard.

A main function of the LLC sub-layer is to enable to use several different sub-MAC sub-layer protocols to allow communication unrelated to topology of a network.

The MAC sub-layer may control occurrence of collision/contention between vehicles when several vehicles (or nodes or a vehicle and peripheral devices) use a shared medium. The MAC sub-layer may format a packet transferred from a superordinate layer to correspond to a frame format of the physical network. The MAC sub-layer may perform addition and identification functions of a sender address/recipient address, carrier detection, collision detection, and fault detection on a physical medium.

The physical layer: the physical layer may define an interface between a node and a transmission medium to a lowest layer on an ITS layer structure and perform modulation, coding, and mapping of a transmission channel to a physical channel for bit transmission between data link layer entities. Further, the physical layer performs a function of notifying the MAC sub-layer whether a wireless medium is being used (busy or idle) through carrier sense and clear channel assessment (CCA). Furthermore, such a physical layer may include a physical layer convergence protocol (PLCP) sub-layer and a physical medium access (PMD) sub-layer based on IEEE standard.

The PLCP sub-layer performs a function of connecting a data frame with the MAC sub-layer. By attaching a header to the received data, the PLCP sub-layer enables to operate the MAC sub-layer regardless of physical characteristics. Therefore, in the PLCP frame, a format thereof may be defined differently according to various different wireless LAN physical layer standards.

A main function of the PMD sub-layer may perform carrier/RF modulation of frames received from the PLCP sub-layer and then transmit the frames to a wireless medium according to transmission and reception transmission related standards.

Layer management performs a function of managing and servicing information related to an operation and security of an access layer. Information and service are bilaterally transferred and shared through MI (interface between management entity and access layer or MI-SAP) and SI (interface between security entity and access layer or SI-SAP). Two-way information and service transfer between the access layer and a network/transport layer is performed by IN (or IN-SAP).

The MCO sub-layer may provide various services such as a safety service and other services, i.e., a non-safety service other than the safety service using a plurality of frequency channels. By effectively distributing a traffic load in a particular frequency channel to other channels, the MCO sub-layer may minimize collision/contention when communicating between vehicles in each frequency channel. The MCO sub-layer may perform multi-channel access and operation to be described hereinafter based on setting received from the superordinate layer.

FIG. 3 illustrates multi-channel allocation used for an ITS system operation according to an embodiment of the disclosure.

FIG. 3(a) illustrates US spectrum allocation for an ITS, and FIG. 3(b) illustrates EP spectrum allocation for an ITS.

As shown in FIG. 3, the United States and Europe have seven frequencies (each frequency bandwidth: 10 MHz) in 5.9 GHz band (5.855 to 5.925 GHz). Seven frequencies may include one CCH and 6 SCHs. As shown in FIG. 3(a), in the United States, the CCH is allocated to a channel number 178 and as shown in FIG. 3(b), in European, the CCH is allocated to a channel number 180.

In Europe, in order to provide a service that is time-sensitive and having a large data capacity, it is considered to additionally use an ITS-G63 band in a superordinate frequency band based on 5.9 GHz and it is considered to use an ITS-G5 band in a subordinate frequency band. In order to provide a high quality of service by appropriately allocating the service to various multi-channels in such an environment, development of an efficient multi-channel operation method is required.

The CCH indicates a radio channel used for exchange of a management frame and/or a WAVE message. The WAVE message may be a WAVE short message (WSM). The SCH is a radio channel used for providing a service and represents a random channel instead of the CCH. In an embodiment, the CCH may be used for communication of a Wave Short Message Protocol (WSMP) message or communication of a system management message such as a WAVE Service Advertisement (WSA). The SCH may be used for general-purpose application data communication, and communication of such general-purpose application data may be coordinated by service related information such as the WSA.

Hereinafter, the WSA may be also referred to as service advertisement information. The WSA is an application may provide information including announcement of availability of an application-service. A WSA message may identify and describe an application service and a channel in which the service is accessible. In an embodiment, the WSA may include a header, service information, channel information, and WAVE routing advertisement information.

Service advertisement information for service access may be a periodic message. In an embodiment, Co-operative Awareness Messages (CAM) may be periodic messages. The CAM may be broadcasted periodically by a facilities layer. In an embodiment, the CAM may also be transmitted by the RSU, and in such a case, the CAM may be transmitted and received in an RSU interval hereinafter.

Decentralized Environmental Notification Messages (DENM) may be event messages. The event message may be triggered by detection of the event to be transmitted. Service messages may be transmitted to manage a session. In the following embodiments, the event message may include a security message/information. The service message may include a non-safety message/information.

A V2X communication device may broadcast a cooperative awareness message (CAM) or a decentralized environmental notification message (DENM).

The CAM is distributed in an ITS network, and provides information for at least one of the presence, location or communication state of an ITS station. The DENM provides information for a detected event. The DENM may provide information for a given driving situation or event detected by an ITS station. For example, the DENM may provide information for a situation, such as an emergency electronic brake lamp, a traffic accident, a vehicle problem, or a traffic condition.

FIG. 4 illustrates a channel coordination mode of multi-channel operation according to an embodiment of the present disclosure.

FIG. 4 illustrates one of channel coordination modes of multi-channel operation: (a), (b) continuous mode, (c) altering mode, (d) extended mode, and (e) immediate mode. The channel coordination mode may indicate a method for accessing a CCH and an SCH by a V2X device.

A V2X device may access at least one channel. As an embodiment, a single-radio device may monitor a CCH and exchange data via an SCH. To this purpose, a channel interval has to be specified, where FIG. 4 illustrates the channel interval, namely, time slot allocation. Radio channel altering may be operated based on an interval synchronized in association with a common time base. A sync interval may include a plurality of time slots. And a plurality of time slots may correspond to a CCH interval and an SCH interval. In this case, a sync interval may include a CCH interval and an SCH interval. During the CCH interval, traffic may be exchanged via the CCH. A single-radio device participating in an application service may switch to the SCH during the SCH interval. Each of the CCH interval and the SCH interval may include a guard interval. Each interval may start as a guard interval.

As an embodiment, exchange of multi-channel operation information and safety-related service information may be performed via the CCH during the CCH interval. Also, negotiation for exchange of information between a service provider and a user may be performed via the CCH during the CCH interval. A hardware timing operation for channel altering of the V2X device may be initiated by a sync signal obtained from Coordinated Universal Time (UTC)-based estimation. Channel synchronization may be performed at 1 Pulse Per Second (PPS) intervals based on the UTC.

As an embodiment, FIG. 4 illustrates a channel coordination method of Multi-Channel Operation (MCO) described in the IEEE 1609.4, where two MAC layers perform time division on one physical layer to use a CCH and the respective channel modes in an alternate manner.

(a) & (b) Continuous mode: In the continuous mode, each vehicle or all the vehicles operate independently of a time division reference such as the time slot/CCH interval/SCH interval of FIG. 4. In the continuous mode, a V2X device may continuously receive operation information and safety-related service information of multi-channels from a specified CCH or SCH or may perform exchange of information between a service provider and a user.

(c) Altering mode: In the altering mode, each vehicle or all the vehicles may receive operation information and safety-related service/information of multi-channels or may perform a negotiation process for information exchange between a service provider and a user during the CCH interval. In the altering mode, each vehicle of all the vehicles perform service/information exchange between the service provider and the user during the SCH interval. In the altering mode, a V2X device may perform communication via the CCH and the SCH in an alternate manner during configured CCH and SCH intervals.

(d) Extended mode: In the extended mode, communication during the CCH interval and the SCH interval may be performed as in the altering mode. However, service/information exchange during the SCH interval may also be performed during the CCH interval. As an embodiment, a V2X device in the extended mode may transmit and receive control information during the CCH interval; when the V2X device enters the SCH interval, it may maintain the SCH interval until service/information exchange is terminated.

(e) Immediate mode: In the immediate mode, a V2X device may perform communication as in the altering mode and/or extended mode. However, if negotiation for information exchange is completed during the CCH interval, a V2X device in the immediate mode may initiate information exchange by immediately performing channel switching to a specified SCH instead of waiting for the CCH interval to be terminated. As shown in FIG. 4, the extended mode and the immediate mode may be used together.

In the channel coordination modes of FIG. 4, management information of multi-channels and information exchange and negotiation for service provision may be performed only via the CCH during the CCH interval. Reception of safety-related service and information or negotiation for information exchange between a service provider and a user may also be performed only via the CCH during the CCH interval.

A guard interval may be included between the CCH interval and the SCH interval. A guard interval may secure time needed for synchronization when a communication device performs frequency change or channel change. At the time of channel change, hardware timer operation may be initiated by a sync signal obtained from Coordinated Universal Time (UTC)-based estimation. Channel synchronization may be performed at 1 Pulse Per Second (PPS) intervals by using the UTC as a reference signal.

As an embodiment, a sync interval may include the CCH interval and the SCH interval. In other words, one sync interval may include two time slots, and each of the CCH interval and the SCH interval may correspond to time slot 0 and time slot 1. The start of the sync interval may coincide with the start of the common time reference second. During one second, an integer multiple of the sync interval may be included.

A V2X device may perform communication by using the Multichannel Operation (MCO) technique employing multi-antennas. As an embodiment, the ETSI MCO design specified in the ETSI TS 102 646-4-2 mainly considers the following objectives.

A Channel Access (CA) method that effectively uses channel resources in multi-channels by using multi-antennas should be provided.

A mechanism should be provided, which allows a V2X device to effectively listen to a Service Announcement Message (SAM) providing V2X service information and to switch to the corresponding announced service channel.

A mechanism should be provided, which minimizes the interference effect between adjacent channels occurred when the same vehicle performs V2X transmission and reception by using two or more multi-antennas and adjacent channels.

The Control Channel (CCH) is a reference channel to which traffic safety-related messages such as Cooperative Awareness Message (CAM), Decentralized Environmental Notification Message (DENM), Topology (TOPO), and MAP are transmitted. Other safety messages not fully transmitted to the CCH may be provided through the SCH. If a safety message of a new type is added, the additional safety message may be provided through the SCH.

The SAM announces a V2X service provided through the Service Channel (SCH), where the SAM may be provided through a well-known reference channel. For example, information on a V2X service provided in the ITS-G5A/B/D channel band may be provided through the SAM via a reference CCH. However, since provision of a V2X service through the CCH may affect provision of a safety message, the service may not be provided through the CCH. The information on a V2X service provided in each channel band may also be provided via an alternate reference SCH arbitrarily specified in the channel band through the SAM.

In order to provide various V2X services and distribute V2X traffic load, a design of a multi-channel operation (MCO) method using a plurality of channels is in progress. In the multi-channel operation, methods for channel selection in consideration of a type and a priority of provided service, and channel management, and channel operation in consideration of a traffic load of each channel, quality of each channel, are important. In single/multi-hop communication operation using multi-channels, various scenarios requiring channel selection/change may be expected. The channel selection/change may be performed in a vehicle or a road side unit (RSU).

A channel for providing any safety/non-safety service or a newly provided safety/non-safety service in the future may not be defined or may not be allocated previously. A channel predefined for providing a specific safety/non-safety service may not be used or may have low usage efficiency for a space/region/time. In this case, it is possible to increase efficiency of resource use by allowing provision of other safety/non-safety services not defined in a corresponding channel. For a non-safety service provided in a channel that is not previously defined, when the provision of high-priority safety services with predefined use is increased, the provision of the non-safety service may be changed to another channel. The changed channel may be a channel that allows provision of a service that is not previously defined.

For channels allocated and used to provide specific safety/non-safety services, Quality of Service (QoS) may be low or the Quality of Service (QoS) may not be satisfied depending on the space/region/time. The QoS satisfaction may be determined according to the degree of a congestion level, a delay according to a traffic load, an inter-channel interference, and co-channel interference. By changing a channel or selecting a new channel, the QoS satisfaction for a corresponding service may be increased. For non-safety services provided in a channel that is not previously defined, the provision of high-priority safety services with predefined use may be increased. In this case, the provision of the non-safety service may be changed to another channel. The changed channel may be a channel that allows provision of a service that is not previously defined.

In the following, items that may be considered in designing a channel selection/change method are described. The channel selection/change may be performed in the vehicle or RSU.

When selecting/changing the channel, multi-channel information may be requested. Channel Busy Ratio (CBR) information may be requested. The CBR information is traffic load state information defined as a ratio of a channel's busy section to an observation section. The CBR information may be used to determine channel busy state for vehicles in the same network. The Channel Busy Ratio (CBR) information may indicate a time-dependent value of 0 or more and 1 or less indicating a fraction of a time during which the corresponding channel is busy. A CBR threshold for determining whether a channel is available may be defined in consideration of the priority of a service.

A method of acquiring the multi-channel information may be considered. Multiple receivers (for example, single transmitter+multiple receivers, multiple transmitters+multiple receivers) may be used. Through the multiple receivers, the CBR information for multi-channels may be acquired. The V2X communication apparatus may acquire the CBR information for each channel by scanning the multi-channels for a predetermined time period. The multi-channel information may be acquired through mutual cooperation communication between neighboring vehicles. That is, the CBR information for the multi-channels may be acquired using channel information measured in the own vehicle and channel information measured and shared in the neighboring vehicle.

In the channel selection, a service priority may be considered.

When providing services through multi-hop communication, channel selection and change methods are necessary. When operating the multi-hop communication (e.g. GeoNetworking protocol of ITS-G5 system), the service QoS satisfaction may be low or may not be satisfied depending on the space/region/time.

Standby mode operation may be considered when selecting/changing channels. When high-power transmission is required, the V2X communication apparatus may wait until an effective channel is found in which problems such as adjacent/same channel interference can be minimized.

A method of setting a channel selection/change period may be considered. As a periodic method, a channel selection/change operation may be performed using the periodically acquired CBR information. As a fixed method, the channel selection/change operation may be performed using the CBR information acquired at an initial point in time when the service is provided, and then the channel selection/change operation may not be performed.

In the following, according to an embodiment of the present disclosure, a method of adaptively setting the CBR threshold using the CBR information for multi-channels and a method of selecting/changing a channel using the set CBR threshold will be described in a V2X system in the same network. In addition, an average CBR for the multi-channel CBR is set as a CBR threshold for selecting a channel candidate, and then a method of randomly selecting an arbitrary channel from the channel candidate will be described.

FIG. 5 shows an operation structure between layers for channel selection according to an embodiment of the present disclosure.

A management entity (Management; 5010) may select a channel by calculating and acquiring CBR information, and transmit the calculated channel information to the outside. A metric evaluation block 5030 may calculate CBR_E using CBR_I and CRB_G. A channel selection block 5020 may select a channel based on a result of metric analysis. The metric evaluation block 5030 may belong to the management entity 5010. The metric evaluation block 5030 may estimate and evaluate a channel state by using the channel information CBR_I measured from the own vehicle and the channel information CBR_g collected from the neighboring vehicles. As an embodiment, the metric evaluation block 5030 may acquire CBR using methods such as CBR estimation using an average, CBR estimation using an adaptive algorithm, and CBR estimation using a Min-Max algorithm.

A description of the operation and related parameters for each block shown in FIG. 5 is as follows.

CBR_I (local CBR): CBR information measured in the own vehicle

CBR_g (Global CBR): CBR information measured and shared in neighboring vehicles

CBR_e (estimated CBR): Estimated CBR information calculated using CBR_I and CBR_g Neighbor's link information: The neighbor's link information is CBR information measured in a neighboring vehicle. The neighbor's link information may be shared through a network header of the network/transport layer.

Link Monitoring Block 5040: The link monitoring block may belong to an access layer. The link monitoring block may observe data traffic or beaconing traffic provided using a corresponding channel during an arbitrary estimated window period.

Link Measurement Block 5050: The link measurement block may belong to the access layer. The link measurement block may acquire time stamp information, sequence number information that can identify a channel state from packets received during link monitoring or measure CBR and Received Signal Strength Indication (RSSI) information.

The operations of the blocks shown in FIG. 5 may be performed by a processor of the V2X communication apparatus.

Hereinafter, a channel selection process for single/multi-hop V2X communication using multi-channels will be described. The present disclosure proposes a channel selection method capable of lowering the probability of congestion while distributing a traffic load between channels as evenly as possible. In the present disclosure, CBR information update and CBR balancing may be performed periodically and/or continuously. The CBR information may be measured by using multiple receiving antennas or may be acquired by using information shared from neighboring vehicles. A CBR threshold required to select a channel candidate group may be calculated as an average CBR for multi-channel CBR, and may be continuously updated. In the following, a channel selection method for setting a CBR threshold using the multi-channel CBR information (step-1), setting a channel candidate group is set using the set threshold (step-2), selecting a final channel from the channel candidate group (step 03) will be described.

<Step-1> Calculating the Average CBR Using the Multi-Channel CBR Information and Setting an Adaptive CBR Threshold for Selection of the Channel Candidate Group The average CBR value for multi-channels required for setting the CBR threshold may be calculated instantaneously at every specific time as follows, or may be calculated through an adaptive algorithm using the instantaneously calculated CBR value.

The average CBR calculated instantaneously may be calculated as in Equation 1 below.

$$C\dot{B}R(n) = \left(\frac{1}{N}\right)\sum_i CBRi(n):$$ [Equation 1]

In Equation 1, N represents the number of effective channels. $CBRi(n)$ represents a CBR value measured during nth time slot in ith channel. The time slot represents a window period for channel monitoring. $CBRi(n)$ may be calculated instantaneously. In addition, $CBRi(n)$ may be calculated using CBR information (e.g. . . . , $CBRi(n-2)$, $CBRi(n-1)$) calculated in a previous time slot.

The average CBR using adaptive algorithm may be calculated as in Equation 2 below.

$$\overline{CBR}(n) = \alpha C\dot{B}R(n) + (1-\alpha)\overline{CBR}(n-1)$$ [Equation 2]

In Equation 2, $\alpha(0<\alpha\leq 1)$ represents an oblivion/forgetting factor of the adaptive algorithm. The average CBR using adaptive algorithm may be periodically updated using the instantaneously calculated average CBR value (CBR(n)).

An average CBR compensated may be calculated as at least one of two equations of Equation 3 below.

$$\widetilde{CBR}(n) = \overline{CBR}(n) + \Delta CBR$$

$$\widetilde{CBR}(n) = C\dot{B}R(n) + \Delta CBR)$$ [Equation 3]

In Equation 3, $\Delta CBR$ represents a CBR margin for correcting a CBR value ($C\dot{B}R(n)$ or $\overline{CBR}(n)$) that may be inaccurate.

<Step-2> Selecting Channels Having CBR Information Less than or Equal to $C\dot{B}R(n)$ (or $\overline{CBR}(n)$, or $\widetilde{CBR}(n)$) as a Channel Candidate Group The channel candidate group may be selected as shown in Equation 4 below.

$$CanCH=\{CH_i|CBRi(n)\leq C\dot{B}R(n), i=1,\ldots,N\}$$ [Equation 4]

In Equation 4, CanCH represents a channel candidate group having a CBR value less than or equal to a threshold $CBRi(n)$ in N effective channels. The channel candidate group may be selected without considering a service priority. A method of selecting a channel candidate group in consideration of the service priority will be described later.

<Step-3> Selecting Randomly an Arbitrary Channel from the Channel Candidate Group In order to distribute the traffic load, one channel may be randomly selected from the channel candidate group.

The request for channel selection may occur periodically or dynamically. In this case, operations such as an applied channel change, a channel handoff, and a channel data offloading may be performed. When the channel selection is required only during the initial use of the channel, the operations such as the channel change, the channel handoff, and the channel offloading may not be performed. When the measured CBR value ($CBRi(n)$) for the channel finally selected in step-3 is continuously less than or equal to the CBR threshold, the channel change operation may not occur. However, when a change is requested in an upper layer, a channel change operation may occur.

Hereinafter, in the above-described channel selection method, a method of adaptively updating the CBR threshold in consideration of the service priority in the average CBR value for the multi-channel, and selecting the channel candidate group using the set CBR threshold will be described.

FIG. 6 shows a relationship between channel candidate groups in consideration of a service priority according to an embodiment of the present disclosure.

FIG. 6 shows a concept in which a channel candidate group selected for providing a low-priority service includes a channel candidate group selected for providing a high-priority service in setting a CBR threshold. In FIG. 6, a channel candidate group A has a lower CBR value compared to a channel candidate group B. In the case of the above-described channel selection method, it has a feature of increasing the probability that a channel having a low CBR value is used for providing the high-priority service, and a feature of increasing the probability that a channel having a high CBR value is used for providing the low-priority service. Hereinafter, a method of selecting the channel candidate group by dividing a service priority into a high priority, a medium priority, and a low priority will be described.

A method of selecting a channel candidate group for a medium-priority service may be expressed as Equation 5 below.

$$CanCH=\{CH_i|CBRi(n) \le \beta C\dot{B}R(n), i=1, \ldots, N\}, \beta=1 \quad \text{[Equation 5]}$$

In Equation 5, $\beta$ represents a weight value in consideration of the priority. The CBR threshold ($C\dot{B}R(n)$) may be replaced by $\overline{CBR}(n)$ or $\widetilde{CBR}(n)$.

FIG. 7 shows a method of selecting a channel candidate group for a medium-priority service according to an embodiment of the present disclosure.

In FIG. 7, the CBR threshold is assumed to be an instantaneously calculated average CBR. The CBR threshold is calculated as $0.4(=(0.2+0.4+0.4+0.6+0.5+0.3)/6)$. In FIG. 7, a channel candidate group having a CBR value less than or equal to the CBR threshold includes four channels f0, f1, f2, and f5 (CanCH=$\{$f0, f1, f2, f5$\}$).

A method of selecting a channel candidate group for a high-priority service may be expressed as Equation 6 below.

$$CanCH=\{CH_i|CBRi(n) \le \beta C\dot{B}R(n), i=1, \ldots, N\}, 0<\beta<1 \quad \text{[Equation 6]}$$

FIG. 8 shows a method of selecting a channel candidate group for a high-priority service according to an embodiment of the present disclosure.

In FIG. 8, an average CBR weighted as the CBR threshold is used. The CBR threshold is calculated as 0.32 (0.8×0.4) assuming that the weight $\beta=0.8$. In FIG. 8, a channel candidate group having a CBR value less than or equal to the CBR threshold includes two channels f0 and f5 (CanCH=$\{$f0, f5$\}$).

For a high-priority service, there may be a case where there is no channel satisfying the condition of Equation 6 (CanCH=$\varphi$). In this case, an additional channel selection method may be required.

In the case of an initial phase of selecting a channel before service transmission, when there is no channel satisfying the condition of Equation 6 (CanCH=$\varphi$), $\beta=1$ may be set. If there is no channel candidate group (CanCH=$\varphi$) and CRBi (n)≤x, $\beta=1$ may be set. x represents an arbitrary CBR threshold.

In an intermediate phase in which a channel change is required during the service transmission, as an embodiment, when there is no channel satisfying the condition of Equation 6 (CanCH=$\varphi$), the channel may not be changed. In the intermediate phase in which a channel change is required during the service transmission, as another embodiment, when there is no channel satisfying the condition of Equation 6 (CanCH=$\varphi$), $\beta=1$ may be set.

A method of selecting a channel candidate group for a low-priority service may be expressed as Equation 7 below.

$$CanCH=\{CH_i|CBRi(n) \le (2-\beta)C\dot{B}R(n), i=1, \ldots, N\}, 0<\beta<1 \quad \text{[Equation 7]}$$

FIG. 9 shows a method of selecting a channel candidate group for a low-priority service according to an embodiment of the present disclosure.

In FIG. 9, an average CBR weighted as the CBR threshold is used. The CBR threshold is calculated as 0.48 (=1.2×0.4), assuming the weight $\beta=1.2$ (=2-0.8). In FIG. 9, a channel candidate group having a CBR value less than or equal to the CBR threshold includes four channels f0, f1, f2, and f5 (CanCH=$\{$f0,f1,f2,f5$\}$).

The channel selection method described above in FIGS. 7 to 9 increases the probability that a channel having a low CBR value is used for providing the high-priority service, and increases the probability that a channel having a high CBR value is used for providing the low-priority service. A weight parameter ($\beta$ may be fixed and applied, or may be adaptively determined from an upper layer. In this case, the weight parameter determined by the upper layer may be shared with neighboring vehicles through network signaling.

In the method of selecting the above-described channel candidate group, the weight parameter is reflected in the form of a product of CBR(n). However, it may be reflected in the form of an equivalent sum as shown in Equation 8 below.

$$CanCH=\{CH_i|CBRi(n) \le C\dot{B}R(n)+\Delta_w, i=1, \ldots, N\}, -1<\Delta_w<1 \quad \text{[Equation 7]}$$

In the following, a method of selecting another channel candidate group considering a service priority will be described.

FIG. 10 shows a relationship between channel candidate groups considering a service priority according to another embodiment of the present disclosure.

FIG. 10 shows a concept that a channel candidate group B for providing a service having a high priority includes a channel candidate group A having a low priority in setting a CBR threshold. That is, in the embodiment of FIG. 10, in selecting the channel candidate group, the present disclosure increases a channel selection opportunity by allocating more channel candidate groups to the service having the high priority.

For the method of selecting the channel candidate group of FIG. 10, a method of selecting a channel candidate group for a medium-priority service may be performed as shown in Equation 9.

$$CanCH=\{CH_i|CBRi(n) \le \beta C\dot{B}R(n), i=1, \ldots, N\}, \beta=1 \quad \text{[Equation 9]}$$

In Equation 5, $\beta$ represents a weight value in consideration of the priority. The CBR threshold ($C\dot{B}R(n)$) may be replaced by $\overline{CBR}(n)$ or $\widetilde{CBR}(n)$.

For the method of selecting the channel candidate group of FIG. 10, a method of selecting a channel candidate group for a high-priority service may be performed as an embodiment of Equation 10.

$$CanCH=\{CH_i|CBRi(n) \le (2-\beta)C\dot{B}R(n), i=1, \ldots, N\}, 0<\beta<1 \quad \text{[Equation 10]}$$

For the method of selecting the channel candidate group of FIG. 10, a method of selecting a channel candidate group for a low-priority service may be performed as an embodiment of Equation 11.

$$CanCH=\{CH_i|CBRi(n) \leq \beta C\dot{B}R(n), i=1, \ldots, N\},$$
$$0<\beta<1 \quad \text{[Equation 11]}$$

Accordingly, in the embodiment of FIG. 10, a service having a high priority may have a candidate group including more channels, and a service having a low priority may have a candidate group including fewer channels.

Hereinafter, in a method of selecting a channel candidate group considering the service priority, a method of setting a weight will be described in more detail.

Table 1 shows an example of weight setting considering user ranking.

TABLE 1

| User priority | AC (ACcess Category) | Weighting value (β) |
|---|---|---|
| 1, 2 | BackGround (AC_BK) | β, example) β = 2 − 0.8 = 1.2 |
| 0, 3 | Best Effort (CA_BE) | β, example) β = 2 |
| 4, 5 | Video (AC_VI) | β, example) β = 2 |
| 6, 7 | Voice (AC_VO) | β, example) β = 0.8 |

The weight may be set in consideration of eight service transmission priorities defined in the operation of Enhanced Distributed Channel Access (EDCA) of the IEEE 802.11p/ITS-G5 system. Table 1 shows an embodiment of weight setting assuming the channel selection method described in the embodiment of FIG. 6. In Table 1, traffic having a high priority has more chances to be transmitted than traffic having a low priority in EDCA. On average, vehicles having high-priority traffic wait less than vehicles having low-priority traffic before transmitting packets. This is because a shorter contention window (CW) and shorter arbitration inter-frame space (AIFS) are allocated for the high-priority traffic. In addition, EDCA allows a V2X communication apparatus to occupy and use channels without competition during a period called transmit opportunity (TXOP). That is, the V2X communication apparatus may transmit as many packets as possible during the TXOP determined within the limit not exceeding the maximum period of the TXOP. If the frame is too long to be transmitted in one TXOP, the V2X communication apparatus may divide and transmit the frame.

In the embodiment of Table 1, when the priority is 1, 2, a higher weight is set compared to the case where the priority is 6, 7. Therefore, the CBR threshold used for a low-priority service has a value larger than the CBR threshold used for a high-priority service. As a result, the channel candidate group selected for providing the low-priority service may include the channel candidate group selected for providing the high-priority service. In the embodiment of Table 1, in the case of user priorities 0, 3 and 4, 5, the weight is set to 1. That is, the weight is set so that the traffic load between channels may be distributed as uniformly as possible. For Table 1, various embodiments of weight setting in consideration of user priority may be considered.

Table 2 shows an embodiment of weight setting assuming the channel selection method described in the embodiment of FIG. 10.

TABLE 2

| User priority | AC (ACcess Category) | Weighting value (β) |
|---|---|---|
| 1, 2 | BackGround (AC_BK) | β, example) β = 0.8 |
| 0, 3 | Best Effort (CA_BE) | β, example) β = 2 |
| 4, 5 | Video (AC_VI) | β, example) β = 2 |
| 6, 7 | Voice (AC_VO) | β, example) β = 2 − 0.8 = 1.2 |

In Table 2, when the priority is 6, 7, a lower weight is set compared to the case where u) the priority is 1, 2. Therefore, the CBR threshold used for the low-priority service has a value smaller than the CBR threshold used for the high-priority service. As a result, the channel candidate group selected for providing the high-priority service may include the channel candidate group selected for providing the low-priority service. In the embodiment of Table 2, in the case of user priorities 0, 3 and 4, 5, the weight is set to 1. That is, the weight is set so that the traffic load between channels may be distributed as uniformly as possible. For Table 2, various embodiments of weight setting in consideration of user priority may be considered.

In the following, in providing services using various multi-hop communication, an additional technical configuration for the above-described channel selection/change method will be described. The multi-hop communication may be implemented with multi-hop between vehicles, multi-hop between RSUs, multi-hop between vehicles and RSUs.

1) In consideration of the service priority, the number of channels that can hop between channels may be limited. As an embodiment, as the service priority is higher, the number of effective channels that can hop is increased, so that an opportunity for channel selection/change may be expanded. That is, as in the above-described channel selection method, as the service priority is higher, the number of channels in the channel candidate group may be increased. As another embodiment, as the service priority is higher, the number of effective channels that can hop may be decreased. Thus, data may be delivered quickly through fewer and better channels. As in the above-described channel selection method, as the service priority is higher, the number of channels in the channel candidate group may be decreased.

2) For every n-hop, it may be determined whether or not a channel is changed or a channel change may be allowed. When the channel change is allowed for every hop, latency according to the channel change may increase. Therefore, by allowing the channel change for every n-hop, it is possible to reduce the latency. As an embodiment, when n=2, it may be determined whether or not the channel is changed every two hops. In addition, when the channel change requirement condition is satisfied, the channel may be changed.

3) A channel once applied during multi-hop operation may be restricted in reuse for a certain period. This method minimizes the problem that a multi-hop service is limited and provided to a specific channel. As an embodiment, an arbitrarily selected channel for providing the multi-hop service from among the channel candidate group may not be selected until the multi-hop service is provided by another candidate channel That is, when channel f0 among the selected channel candidate group {f0, f1, f3, f4} is used to provide the multi-hop service, the channel f0 may be excluded from the channel candidate group for providing the next multi-hop service. When the multi-hop service is provided among all the channel candidate groups, a process of selecting a channel candidate group and selecting an arbitrary channel may be performed again.

4) The channel selection process for multi-hop operation may be performed only at the beginning of the channel hopping operation, and the channel change may not be allowed during the hopping. If the channel change is allowed for each hop, problems such as an increase in latency between the channel changes may occur. Therefore, when a multi-hop-based service request occurs, the V2X communication apparatus may perform channel selection only once at the beginning of the multi-hop operation, and the multi-hop communication may be performed only on the selected channel.

5) Among the above-described methods, method 1) and method 2) are mixed, so that the multi-hop communication may be operated. In consideration of the service priority, the number of channels that can hop between channels is limited, and in this case, determination of whether a channel exists and allowing of the channel change may be performed every n-hop. In addition, among the above-described methods, method 1 and method 3 may be mixed to operate the multi-hop communication. The number of channels that can hop between channels may be limited in consideration of the service priority. In addition, the channel once applied may be restricted in reuse for the certain period.

FIG. 11 shows a V2X communication apparatus according to an embodiment of the present disclosure.

In FIG. 11, a V2X communication apparatus 11000 may include a communication unit 11010, a processor 11020, and a memory 11030. As described above, the V2X communication apparatus may correspond to an On Board Unit (OBU) or a Road Side Unit (RSU), or may be included in the OBU or RSU. The V2X communication apparatus may be included in an ITS station or may correspond to the ITS station.

The communication unit 11010 may be connected to the processor 11020 and may transmit/receive a wireless signal or a wired signal. The communication unit 11010 may transmit a signal by upconverting data received from the processor 11020 to a transmission/reception band. The communication unit may implement operation of an access layer. As an embodiment, the communication unit may implement operation of a physical layer included in the access layer, or may additionally implement operation of an MAC layer. The communication unit may include a plurality of sub communication units to communicate according to a plurality of communication protocols.

The processor 11020 may be connected to the communication unit 11010 to implement the operation of layers according to the ITS system or the WAVE system. The processor 11020 may be configured to perform operations according to various embodiments of the present disclosure according to the above drawings and description. In addition, at least one of a module, data, program, or software that implements the operation of the V2X communication apparatus 11000 according to various embodiments of the present disclosure described above may be stored in the memory 11030 and executed by the processor 11020.

The memory 11030 is connected to the processor 11020 and stores various data/information for driving the processor 11020. The memory 11030 may be included inside the processor 11020 or installed outside the processor 11020 to be connected to the processor 11020 by known means. The memory may include a secure/non-secure storage device or may be included in the secure/non-secure storage device. Depending on the embodiment, the memory may be referred to as a secure/non-secure storage device.

A specific configuration of the V2X communication apparatus 11000 of FIG. 11 may be implemented so that various embodiments of the present disclosure described above are applied independently or two or more embodiments are applied together.

In an embodiment of the present disclosure, the communication unit may include at least two transceivers. The communication unit may include a transceiver for performing communication according to an WLAN V2X communication protocol based on Institute of Electrical and Electronics Engineers (IEEE) 802.11, and a transceiver for performing communication according to a cellular V2X communication protocol based on Evolved Universal Terrestrial Access (LTE/E-UTRA) of 3rd Generation Partnership Project (3GPP) or 5G New Radio (NR). A transceiver that communicates according to the WLAN V2X communication protocol such as ITS-G5 may be referred to as a WLAN transceiver. A transceiver that communicates according to the cellular communication protocol such as NR may be referred to as a cellular transceiver.

FIG. 12 is a flowchart illustrating a multi-channel transmission method of a V2X communication apparatus according to an embodiment of the present disclosure.

A V2X communication apparatus may acquire CBR information for a plurality of channels (S12010).

The CBR information measured by the V2X communication apparatus or a vehicle equipped with the V2X communication apparatus may be used to acquire the CBR information for the plurality of channels. The CBR information may correspond to a CBR value. In addition, the CBR information for at least one channel shared by a neighboring vehicle or a neighboring V2X communication apparatus may be used to acquire the CBR information for the plurality of channels. The V2X communication apparatus may acquire CBR information for multi-channels by using the CBR information measured in the own vehicle and the CBR information shared from the neighboring vehicle.

The V2X communication apparatus may set a CBR threshold (S12020).

The CBR threshold may correspond to an average value of the CBR values for the plurality of channels, as in the above equations, and the average value may be calculated instantaneously or adaptively. The CBR threshold may correspond to a corrected average value or may correspond to a weighted average value, as in the above equations. The CBR threshold may be related with a priority. That is, when the CBR threshold is calculated by applying a weight to the average value, the weight may be related with a priority of service corresponding to the transmitted data.

The V2X communication apparatus may select a channel candidate group (S12030).

The channel candidate group may include channels whose CBR value is less than or equal to the CBR threshold. The channel candidate group may be determined as described above with respect to FIGS. 6 to 10.

The V2X communication apparatus may transmit data through a channel included in the channel candidate group (S12040).

The V2X communication apparatus may transmit data through one randomly selected channel among channels included in the channel candidate group. However, according to the priority, the channel may be selected in consideration of the CBR value among the channels included in the channel candidate group. As an embodiment, in the case of data transmission of a service having a high priority, a channel having the lowest CBR value may be selected from the channel candidate group. As another embodiment, in case of data transmission of a service having a low priority, a channel having a high CBR value may be selected from the channel candidate group.

In determining the CBR threshold, the priority may be related with the weight. The priority of the service may include a low priority, a medium priority, and a high priority. As an embodiment, if the service has the medium priority, the weight may be 1, if the service has the high priority, the weight may be set to a value that decreases the CBR average value, and if the service has the low priority, the weight may be set to a value that increases the CBR average value. In addition, as another embodiment, if the service has the medium priority, the weight may be 1, if the service has the high priority, the weight may be set to a value that increases the CBR average value, and if the service has the low priority, the weight may be set to a value that decreases the CBR average value.

The data transmission of the V2X communication apparatus may correspond to multi-hop transmission. In this case, a channel operation method for the above-described multi-hop transmission may be applied. For example, the number of hopping channels may be determined based on the priority of the service corresponding to the transmitted data.

The present disclosure proposes a channel selection/change method in which traffic load between channels is evenly distributed in consideration of fairness between vehicles in the same network. The present disclosure proposes a channel selection process including a method of setting an adaptive CBR threshold, a method of selecting the channel candidate group using the CBR threshold, and a method of selecting a final preferred channel from the channel candidate group.

The CBR threshold may be set in various methods. As an embodiment, using average CBR information for multi-channel CBR values measured every specific time (e.g. every 1 second/2 seconds), the CBR threshold may be updated or set. The CBR threshold may be set to a fixed value. The present disclosure may set a weighted average CBR as the CBR threshold by considering the priority of the service in addition to the average CBR information for the multi-channel CBR values measured every specific time. As an embodiment, the present disclosure may increase the probability of allocating a channel having a lower CBR state as the priority of the service is higher, and increase the probability of allocating a channel having a relatively high CBR state when the priority of the service is low. As another embodiment, the present disclosure may select a channel from many channel candidate groups as the priority of the service is higher, and select a channel from relatively small channel candidate groups when the priority of the service is low. That is, the number of the channel candidate groups may be determined in consideration of the priority of the service. As an embodiment, the present disclosure may determine the channel candidate group using a higher CBR threshold as the priority of the service is higher, and determine the channel candidate group using a relatively low CBR threshold when the priority of the service is low.

A channel having the CBR value lower than the CBR threshold may be classified as the channel candidate group, and the present disclosure may randomly select one arbitrary channel as a final channel or a preference channel from the channel candidate group. The present disclosure proposes a channel candidate selection technique and an arbitrary channel selection technique in order to minimize the influence of the use of CBR information, which may be inaccurate.

The present disclosure, as a method of selecting the channel candidate group in consideration of the service priority, proposes a method of setting a weighted average CBR threshold using a user priority used in enhanced distributed channel access (EDCA). Weights may be set and applied for each of the four user priorities (BackGround (AC_BK), Best Effort (AC_BE), Video (AC_VI), Voice (AC_VO)).

The present disclosure proposes a method for effectively operating channel selection/change when providing a service using multi-hop communication. The present disclosure may limit the number of channels that can hop between channels in consideration of the service priority. The present disclosure may determine whether to change the channel and allow the channel to be changed for each x-hop (x=2, 3, 4, . . . ). The present disclosure may restrict the reuse of the channel once applied during multi-hop operation for the certain period. In the present disclosure, a channel selection process for the multi-hop operation is initially performed, and a channel change process may not be allowed during the hopping.

The embodiments described above are combinations of constituting elements and features of the present disclosure in a predetermined form. Each individual element or feature has to be considered as optional except where otherwise explicitly indicated. Each individual element or feature may be implemented solely without being combined with other elements or features. Also, it is also possible to construct the embodiments of the present disclosure by combining a portion of the elements and/or features. A portion of a structure or feature of an embodiment may be included in another embodiment or may be replaced with the corresponding structure or feature of another embodiment. It should be clearly understood that the claims which are not explicitly cited within the technical scope of the present disclosure may be combined to form an embodiment or may be included in a new claim by an amendment after application.

The embodiments of the present disclosure may be implemented by various means such as hardware, firmware, software, or a combination thereof. In the case of hardware implementation, one embodiment of the present disclosure may be implemented by using one or more of ASICs (Application Specific Integrated Circuits), DPSs (Digital Signal Processors), DSPDs (Digital Signal Processing Devices), PLDs (Programmable Logic Devices), FPGAs (Field Programmable Gate Arrays), processors, controllers, micro-controllers, and micro-processors.

In the case of implementation by firmware or software, one embodiment of the present disclosure may be implemented in the form of modules, procedures, functions, and the like which perform the functions or operations described above. Software codes may be stored in the memory and activated by the processor. The memory may be located inside or outside of the processor and may exchange data with the processor by using various well-known means.

It is apparent for those skilled in the art that the present disclosure may be embodied in other specific forms without departing from the essential characteristics of the present disclosure. Therefore, the detailed descriptions above should be regarded as being illustrative rather than restrictive in every aspect. The technical scope of the present disclosure should be determined by a reasonable interpretation of the appended claims, and all of the modifications that fall within an equivalent scope of the present disclosure belong to the technical scope of the present disclosure.

MODE FOR INVENTION

It should be clearly understood by those skilled in the art that the present disclosure may be changed or modified in various ways without departing from the technical principles and scope of the present disclosure. Therefore, it is intended that the present disclosure includes changes and modifications of the present disclosure defined by appended claims and provided within their equivalent scope.

The present disclosure describes both of the apparatus disclosure and the method disclosure, and descriptions of the respective disclosures may be applied in a supplementary manner.

Various embodiments have been described in their best mode for implementing the present disclosure.

INDUSTRIAL APPLICABILITY

The present disclosure is used in a series of vehicle communication applications.

It should be clearly understood by those skilled in the art that the present disclosure may be changed or modified in various ways without departing from the technical principles and scope of the present disclosure. Therefore, it is intended that the present disclosure includes changes and modifications of the present disclosure defined by appended claims and provided within their equivalent scope.

The invention claimed is:

1. A multi-channel transmission method of a communication apparatus, comprising:
   acquiring CBR (channel busy ratio) values for each of a plurality of channels;
   setting a CBR threshold based on the CBR values;
   selecting a channel candidate group based on the CBR threshold, and
   transmitting data through a channel included in the channel candidate group,
   wherein the CBR threshold is related to an average value of the CBR values for each of the plurality of channels, and
   wherein based on multi-hop transmission of the data a channel once used for transmitting data is restricted from being used again for a predetermined period, and a channel change is restricted during hopping.

2. The method of claim 1, wherein the average value is obtained instantaneously or adaptively.

3. The method of claim 1, wherein the CBR threshold is set, based on a weight applying to a CBR average value, and the weight is related with a priority of service related to the transmitted data.

4. The method of claim 3, wherein the priority of the service includes a low priority, a medium priority, and a high priority, and based on the service having the medium priority, the weight is 1, based on the service having the high priority, the weight is set to a value that decreases the CBR average value, and based on the service having the low priority, the weight is set to a value that increases the CBR average value.

5. The method of claim 3, wherein the priority of the service includes a low priority, a medium priority, and a high priority, and based on the service having the medium priority, the weight is 1, based on the service having the high priority, the weight is set to a value that increases the CBR average value, and based on the service having the low priority, the weight is set to a value that decreases the CBR average value.

6. A communication apparatus comprising:
   a memory configured to store data;
   a transmitter and a receiver configured to transmit and receive radio signals; and
   a processor configured to control the memory and the transmitter and receiver,
   wherein the processor is further configured to:
      acquire CBR (channel busy ratio) values, one for each of a plurality of channels,
      set a CBR threshold based on the CBR values,
      select a channel candidate group based on the CBR threshold, and
      transmit data through a channel included in the channel candidate group,
      wherein the CBR threshold is related to an average value of the CBR values for each of the plurality of channels,
      wherein based on multi-hop transmission of the data a channel once used for transmitting data is restricted from being used again for a predetermined period, and a channel change is restricted during hopping.

7. The apparatus of claim 6, wherein the average value is obtained instantaneously or adaptively.

8. The apparatus of claim 6, wherein the CBR threshold is set, based on a weight applying to a CBR average value, and the weight is related with a priority of service related to the transmitted data.

9. The apparatus of claim 8, wherein the priority of the service includes a low priority, a medium priority, and a high priority, and based on the service having the medium priority, the weight is 1, based on the service having the high priority, the weight is set to a value that decreases the CBR average value, and based on the service having the low priority, the weight is set to a value that increases the CBR average value.

10. The apparatus of claim 8, wherein the priority of the service includes a low priority, a medium priority, and a high priority, and based on the service having the medium priority, the weight is 1, based on the service having the high priority, the weight is set to a value that increases the CBR average value, and based on the service having the low priority, the weight is set to a value that decreases the CBR average value.

11. The method of claim 1, wherein the channel candidate group includes channels whose CBR value is less than or equal to the CBR threshold.

* * * * *